A. LATOURELLE.
SHAFT TUG AND HITCHING DEVICE.
APPLICATION FILED JAN. 20, 1908.
925,488.
Patented June 22, 1909.
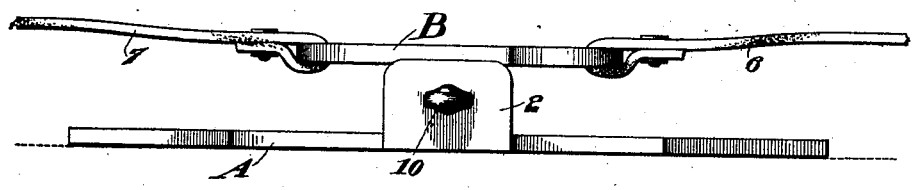
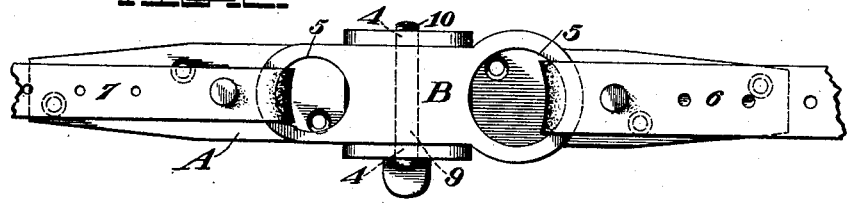
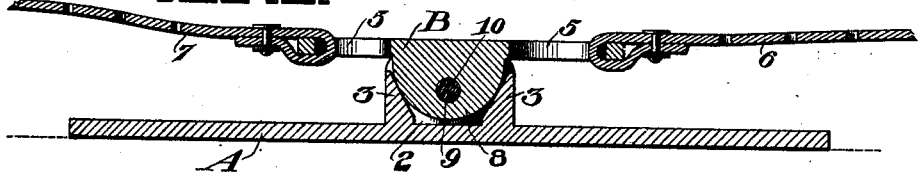

UNITED STATES PATENT OFFICE.

ALEXANDER LATOURELLE, OF KEESEVILLE, NEW YORK.

SHAFT-TUG AND HITCHING DEVICE.

No. 925,488. Specification of Letters Patent. Patented June 22, 1909.

Application filed January 20, 1908. Serial No. 411,641.

*To all whom it may concern:*

Be it known that I, ALEXANDER LATOURELLE, a citizen of the United States, residing at Keeseville, in the county of Essex and State of New York, have invented certain new and useful Improvements in Shaft-Tugs and Hitching Devices, of which the following is a specification.

My invention relates to an improvement in shaft tugs and hitching devices, and the object is to provide a means which is connected to the tugs or traces of a harness which can be connected to the shaft or thills of a wagon whereby the horse or draft animal can be quickly hitched to the wagon, and which will also form an attachment for the hold-back straps.

The invention relates to certain novel features of construction and combinations of parts which will be hereinafter described and pointed out in the claim.

In the accompanying drawings:—Figure 1 is a view in side elevation. Fig. 2 is a top plan view. Fig. 3 is a longitudinal sectional view.

A, represents the base plate which is secured to the shaft or thill, and 2 is a socket formed therein having the interior walls 3, 3, beveled and through the side walls, openings 4, 4, are formed.

A hitching plate B is provided with openings 5, 5, at each end in which are received straps 6 and 7, which are secured in any suitable manner, and the straps 6 are connected to the ends of the trace or tug by buckles or other means. The strap 7 is connected to the hold-back strap by a buckle or other means. On the lower side of the plate B is a preferably rounded projection, or tongue 8 having a hole 9 extending transversely therethrough. This tongue or projection is received in the socket 2 and pins 10, 10, pass through the holes 4, in the side walls and the hole 9 in the tongue or projection 8 thereby making a secure connection for the tug or trace or hold-back. By this connection, a horse can be quickly detached from a wagon or hitched to it as it will do away with the necessity of hitching the traces or tugs to the whiffletree, and winding or connecting the hold-backs to the thill or shaft, as by this construction I can make all the connections by simply connecting the hitching plate to the base plate.

It is evident that many slight alterations might be made in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

A hitching device comprising a base plate having a socket formed therein, the interior of the end walls thereof being beveled and the side walls provided with openings, and a hitching plate having large openings at each end and provided with a rounded projection or tongue at or near the center and a removable pin for detachably connecting the base and hitching plates together, said pin extending transversely through the walls of the socket and the projection or tongue whereby the hitching plate is capable of rocking more or less endwise to accommodate itself to the motion of the draft animal.

In testimony whereof I affix my signature in presence of two witnesses.

ALEXANDER LATOURELLE.

Witnesses:
WALTER S. MACE,
OLIVER A. WOLCOTT.